United States Patent [19]

Weihs

[11] Patent Number: 4,483,404

[45] Date of Patent: Nov. 20, 1984

[54] SELF-ALIGNING SCALE ASSEMBLY

[75] Inventor: Frederick H. Weihs, Toledo, Ohio

[73] Assignee: Benny N. Dillon, Worthington, Ohio

[21] Appl. No.: 527,790

[22] Filed: Aug. 30, 1983

[51] Int. Cl.³ .................... G01G 5/04; G01G 19/02
[52] U.S. Cl. .................................. 177/255; 177/134; 177/DIG. 9
[58] Field of Search ............... 177/132, 133, 134, 135, 177/255, DIG. 9

[56] References Cited

U.S. PATENT DOCUMENTS 4,248,317 2/1981 Rahav ............................ 177/134
4,258,810 3/1981 Susor ........................... 177/134 X Primary Examiner—E. A. Goldberg
Assistant Examiner—Patrick W. Foster
Attorney, Agent, or Firm—Yount & Tarolli

[57] ABSTRACT

A scale includes a movable platform which is supported by a plurality of improved force transmitting assemblies. Upon sideways movement of the platform, the force transmitting assemblies and platform interact to align the force transmitting assemblies and to center the platform. Each force transmitting assembly includes a slider which is movable along a base surface. A rocker pin transmits force between the slider and a load cell beam which is connected with the platform. When the platform is moved sideways relative to the base, the rocker pin is tilted to a maximum offset position in which horizontally offset vertical force components are applied to the rocker pin. In accordance with the present invention, stop surfaces on the slider and load cell beam are disposed in abutting engagement when the rocker pin is in a maximum offset position.

12 Claims, 7 Drawing Figures

SELF-ALIGNING SCALE ASSEMBLY

BACKGROUND OF THE INVENTION

An improved self-aligning scale assembly was invented by Benny N. Dillon, to whom this application is assigned, and is described in application Ser. No. 527,325, filed Aug. 29, 1983 and entitled SELF-ALIGNING SCALE ASSEMBLY AND METHOD. This scale assembly includes a platform which is supported by a plurality of force transmitting assemblies. The force transmitting assemblies and platform cooperate to automatically center the platform relative to an enclosing structure and to align the force transmitting assemblies and platform. The automatic centering of the platform and aligning of the force transmitting assemblies is accomplished by moving the platform back and forth in sideways directions. Centering the platform and aligning the force transmitting assemblies is effective to eliminate sideward force components on load cells in the force transmitting assemblies.

Each force transmitting assembly in the aforementioned scale assembly includes a support member which may be the arm of a load cell, a slider and a force transmitting member. In one embodiment of the scale assembly invented by Mr. Dillon, the force transmitting member is a rocker pin having an upper end portion disposed in a recess in the load cell arm and a lower end portion disposed in a recess in the slider. The load cell arm and slider are relatively movable from an aligned position through a range of offset positions to any one of a plurality of maximum offset positions.

When the load cell arm and slider are in a maximum offset position, the side of the rocker pin is disposed in abutting engagement with the side of the recess in the load cell arm. This results in the rocker pin and slider being held against movement relative to the load cell arm. Therefore, continued movement of the platform relative to the base results in movement of the slider relative to the base.

Although the aforementioned scale assembly is generally satisfactory in its mode of operation and represents a substantial improvement over prior scale assemblies, there may be a tendency for the load transmitting member or pin to slide relative to the load cell arm when the force transmitting assembly is in a maximum offset condition. In addition, the recess in the load cell arm must be accurately machined so that the rocker pin will engage the side of the recess when a predetermined amount of relative movement has occurred between the platform and slider.

BRIEF SUMMARY OF THE INVENTION

A new scale assembly includes a platform which is supported by a plurality of improved force transmitting assemblies. The force transmitting assemblies and platform cooperate to automatically center the platform. Each of the force transmitting assemblies includes a support member and a slider. A force transmitting member is disposed in engagement with the slider and the support member.

The slider and support member are movable relative to each other from an aligned position through a series of increasingly offset positions to a maximum offset position. When the support and slider members have moved to a maximum offset condition, stop surface areas on the slider and support member are disposed in abutting engagement. This prevents relative movement between the slider and support member and transmits force to effect sliding movement of the slider during continued relative movement between the platform and base.

Accordingly, it is an object of this invention to provide a new scale assembly having a platform supported by a plurality of improved force transmitting assemblies and wherein stop surface areas on a slider and support member in a force transmitting assembly are disposed in abutting engagement when the force transmitting assembly is in a maximum offset condition.

BRIEF DESCRIPTION OF THE DRAWINGS

The foregoing and other objects and features of the present invention will become more apparent upon consideration of the following description taken in connection with the accompanying drawings wherein.

DESCRIPTION OF SPECIFIC PREFERRED EMBODIMENTS OF THE INVENTION

Scale Assembly—General

Figure 1:
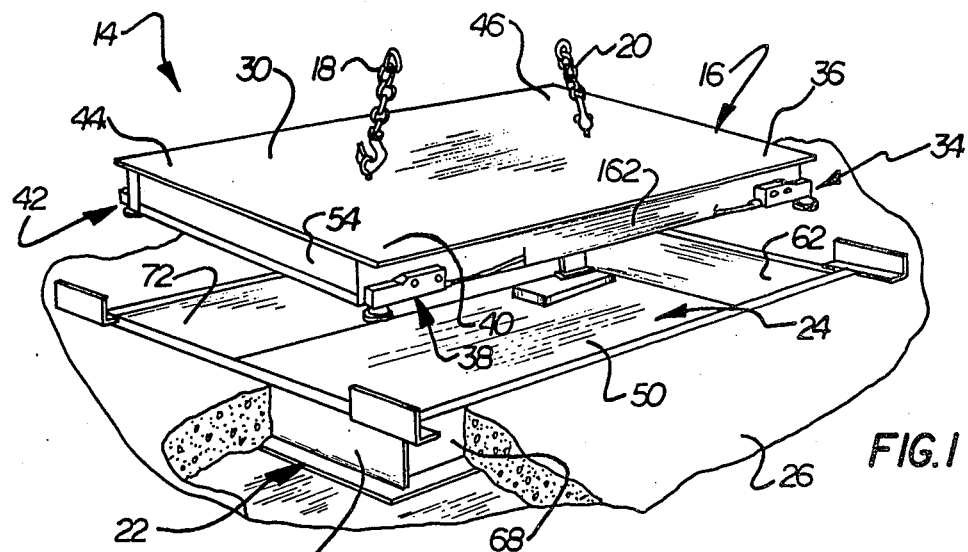
FIG. 1 is a fragmentary, pictorial illustration of the installation of a scale assembly.

The installation of a scale assembly 14 is illustrated in FIG. 1. The scale assembly 14 includes a rectangular platform 16 which receives a load to be weighed. The platform 16 is shown in FIG. 1 being lowered by chains 18 and 20 into a rectangular frame 22 disposed in a shallow pit 24 in a floor 26. When the platform 16 is disposed in the frame 22, a flat upper surface 30 of the platform is level with an upper surface of the floor 26. Although the platform 16 has been shown as having a flat upper surface, the platform could have any desired configuration suitable for receiving a load.

A force transmitting assembly is provided at each of the four corners of the rectangular platform 16. Thus, a force transmitting assembly 34 is disposed at a corner 36, a force transmitting assembly 38 is disposed at a corner 40, a force transmitting assembly 42 is disposed at a corner 44 and a force transmitting assembly 45 (shown only in FIG. 6) is disposed at a corner 46 of the platform 16. Each of the four identical force transmitting assemblies is securely connected with the platform 16 in a manner similar to that disclosed in U.S. Pat. No. 4,258,814.

When the platform 16 is lowered into the somewhat larger frame 22 (FIG. 1), the platform will not be precisely centered relative to the frame and there will probably be unequal distances between the sides of the platform and the frame. In addition, the force transmitting assemblies 34, 38, 42 and 45 will probably be in a nonaligned relationship with the platform 16. The nonaligned force transmitting assemblies will be effective to transmit sideward or horizontal force components which tend to impair the accuracy of the scale assembly 14.

The platform 16 is automatically centered and the force transmitting assemblies are automatically aligned with the platform by merely moving the platform sideways relative to a base or floor 50 of the pit 24. If the force transmitting assemblies 34, 38, 42 and 45 are subsequently moved from an aligned condition (FIG. 5) to a nonaligned condition (FIG. 4), they are self-restoring to the aligned condition. This self-restoring feature of the force transmitting assemblies prevents them from being actuated to a misaligned condition by the application of operating loads to the scale assembly 14.

Centering of the platform 16 relative to the frame 22 provides a space between the platform and frame so that the platform does not abut or rub against the frame. Aligning the force transmitting assemblies 34, 38, 42 and 45 with the platform 16 results in the transmission of only vertically aligned force components which can be accurately measured by load cells. Therefore, there are no locked-in sideward force components on parts of the scale. The automatic centering of the platform and alignment of the force transmitting assemblies 34, 38, 42 and 45 facilitates the installation and subsequent maintenance of the scale assembly 14.

Figure 2:
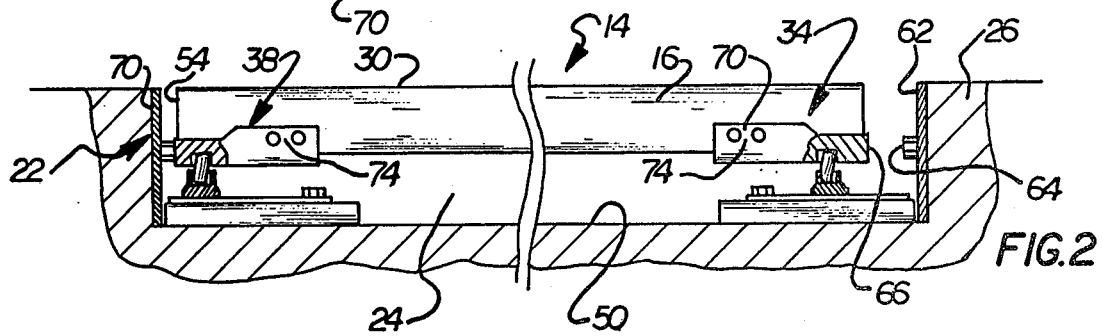
FIG. 2 is an exaggerated fragmentary schematic illustration of the scale assembly of FIG. 1 as initially installed with the platform in a noncentered relationship relative to a surrounding frame and with force transmitting assemblies in nonaligned relationships with the platform.

When the scale assembly 14 is installed, one of the platform sides, for example, the side 54 (FIG. 2), may be too close to the frame 22. In addition, the components of the force transmitting assemblies 34, 38, 42 and 45 may not be aligned properly with the platform 16. It should be noted that the extent of misalignment of the platform and force transmitting assemblies illustrated in FIG. 2 will only occur during installation and has been exaggerated in FIG. 2 for purposes of illustration.

In order to center the platform 16 in the frame 22 and align the force transmitting assemblies 34, 38, 42 and 45 with the platform 16, the platform is moved sideways toward and away from each of the four sides of the frame 22. Thus, the platform 16 is moved toward the right (as viewed in FIG. 2) toward a side 62 of the frame 22. The rightward movement of the platform is interrupted when a bumper or stop member 64 engages a stop surface 66 connected with the platform.

Once the bumper 64 has been engaged and the rightward (as viewed in FIG. 2) force on the platform 16 has been removed, restoring forces in the load transmitting assemblies 34, 38, 42 and 45 cause the platform to move toward the left (as viewed in FIG. 2) away from the bumper 64 toward a centered position. The platform 16 is then moved toward and away from each of the other three sides 68, 70 and 72 (FIGS. 1 and 6) of the frame 22. Of course the platform 16 could be moved sideways toward the corners of the rectangular frame 22 rather than toward the sides of the frame if desired.

After this has been done, the frame 16 will be disposed in a centered position and the force transmitting assemblies 34, 38, 42 and 45 will be in an aligned relationship with the platform 16. The aligned force transmitting assemblies 34, 38, 42 and 45 will then transmit only vertical force components between the platform 16 and base 50. These vertical force components can be accurately measured by load cells or other types of force transducers in the force transmitting assemblies.

Figure 3:
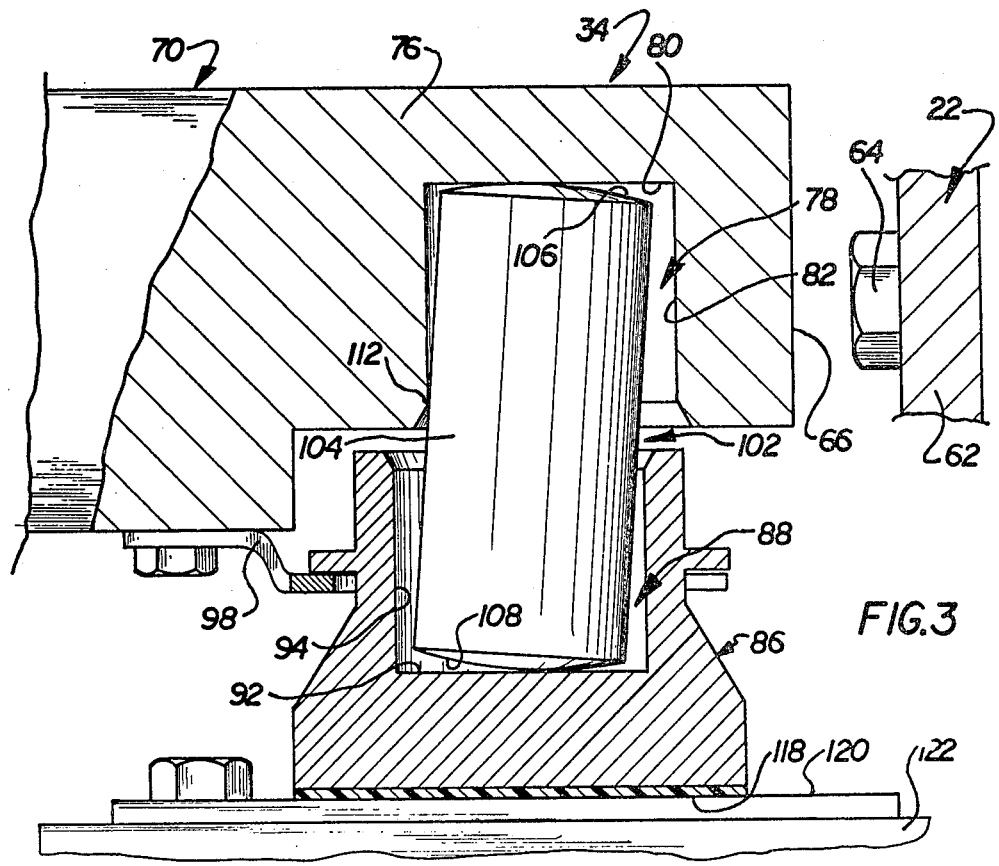
FIG. 3 is an enlarged fragmentary sectional view of one of the force transmitting assemblies of FIG. 2, the components of the force transmitting assembly being shown in a maximum offset condition with the extent of offset being exaggerated for purposes of clarity of illustration.
Figure 4:
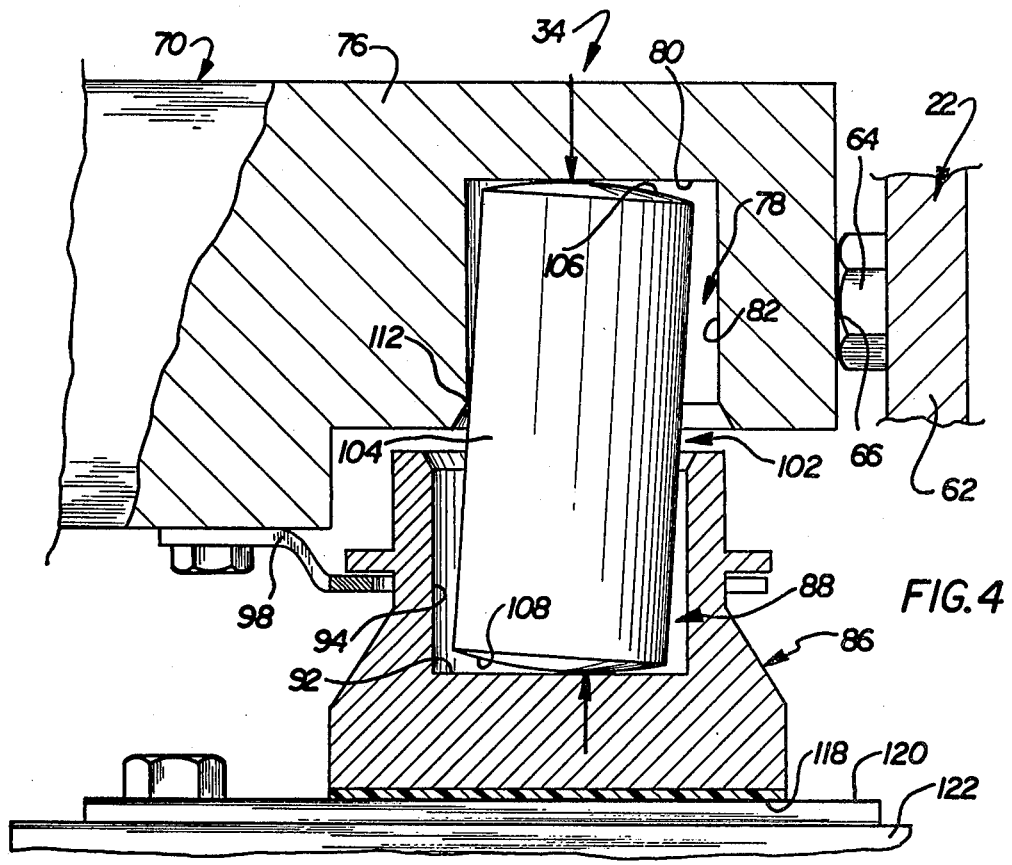
FIG. 4 is a fragmentary sectional view, illustrating the force transmitting assembly of FIG. 3 after the platform has moved sideways.
Figure 5:
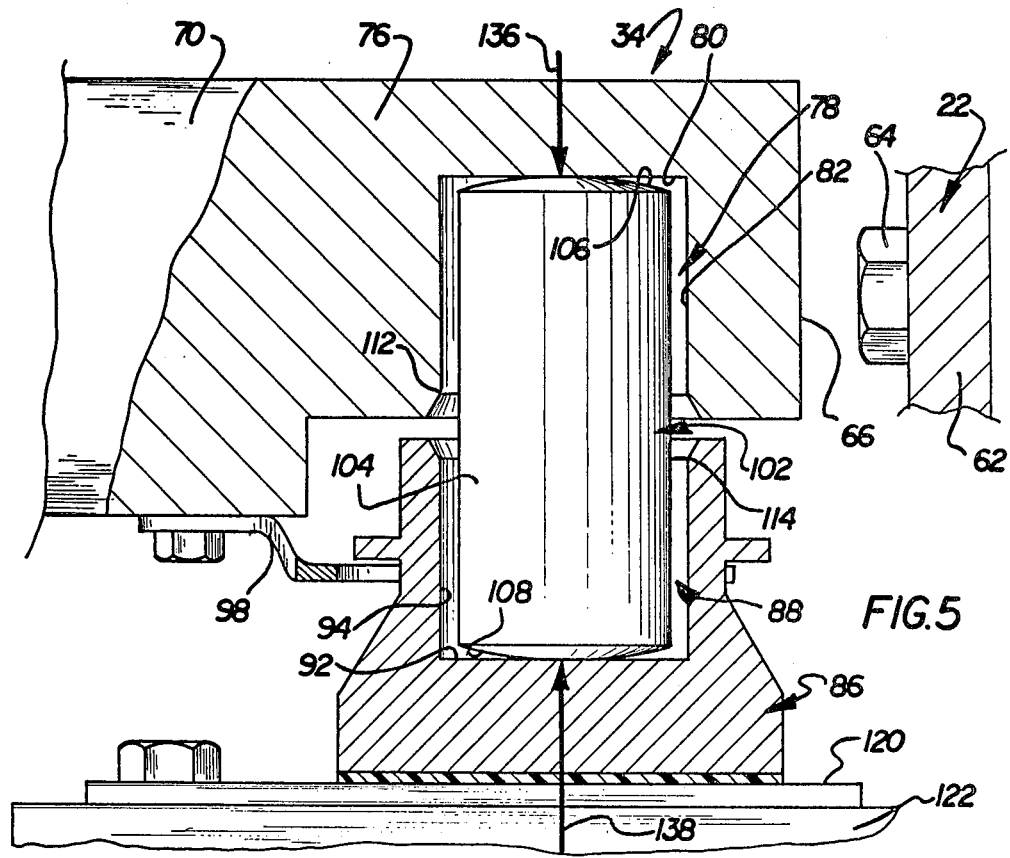
FIG. 5 is a fragmentary sectional view of the force assembly of FIGS. 3 and 4 in an aligned condition.

Force Transmitting Assembly—Embodiment of FIGS. 3-5

The force transmitting assembly 34 (FIG. 3) includes a shear beam load cell or force transducer 70 the type disclosed in U.S. Pat. No. 4,258,814 and made by Hottinger, Baldwin Measurements, Inc., Natick, Mass. The load cell 70 provides an output signal which is indicative of the magnitude of the vertical force applied to the load cell and, therefore, the weight of a load on the platform 16. Although it is preferred to use the shear beam load cell 70, other types of force transducers could be used if desired.

The load cell or force transducer 70 has a metal body portion 74 which is connected to the platform 16 and an outwardly projecting horizontal metal beam portion 76. Adjacent to the outer end of the beam 76 is formed a downwardly opening cylindrical recess 78. The recess 78 has a flat bottom surface 80 and a cylindrical side surface 82.

The force transmitting assembly 34 also includes a metal slider or base pad 86 disposed immediately beneath the outer end portion of the load cell beam 76. The slider 86 has an upwardly opening cylindrical recess 88 of the same size as the recess 78 in the load cell beam 76. The slider recess 88 has a flat bottom surface 92 and a cylindrical sidewall 94. During installation of the scale assembly 14, the slider 86 is retained in position beneath the beam 76 by a retainer plate or member 98 in a manner similar to that disclosed in U.S. Pat. No. 4,258,810.

A metal force transmitting member 102 extends into the recesses 78 and 88 and is effective to transmit load forces from the beam 76 to the slider 86. In the embodiment of FIG. 3, the force transmitting member 102 is a rocker pin having a cylindrical side surface 104 and end surfaces 106 and 108 which are polar portions of spheres. The arcuate end surfaces 106 and 108 abut the flat end surfaces 80 and 92 of the cylindrical recesses 78 and 88.

The cylindrical side surface 104 of the rocker pin 102 has an outside diameter which is smaller than the inside diameter of the recesses 78 and 88. Therefore, the rocker pin 102 has 360 degrees of freedom of movement to tilt from an aligned or vertical position (FIG. 5) through a plurality of offset positions to the maximum offset position shown in FIG. 3. It is preferred to use O-rings or other resilient elements on the ends (not shown) to urge the rocker pin 102 toward a centered position with a force which can be easily overcome. For purposes of clarity of illustration, the extent of the tilting movement of the rocker pin has been exaggerated somewhat in FIG. 3.

When the force transmitting assembly 34 is to be aligned with the platform 16, the platform is moved toward the right (as viewed in FIGS. 2 and 3) until the stop surface 66 at one end of the load cell beam 76 abuts a bumper 64. If the components of the force transmitting assembly 34 are not in the maximum offset condition shown in FIG. 3, the initial rightward movement of the platform 16 moves the load cell beam 76 relative to the slider 86 and causes the rocker pin 102 to tilt in the maximum offset position. At this time, the vertical central axis of the upper recess 78 is offset from the vertical central axis of the lower recess 88.

When the force transmitting assembly 34 is in the maximum offset condition of FIG. 3, the rocker pin 102 is held against further tilting movement by engagement of the side surface 104 of the rocker pin with a circular edge portion 112 of the recess 78. Therefore, once the force transmitting assembly 34 has moved to the maximum offset condition shown in FIG. 3, the spatial relationship between the load cell 76, rocker pin 102 and slider 86 remains constant as the platform continues to move toward the right. This results in sliding movement of a Teflon covered circular bottom surface 118 of the slider 86 along a slider plate 120 preferably of stainless steel which is connected to a stationary base plate 122.

The coefficient of friction between the Teflon coated bottom surface 118 of the slider 86 and the upper surface of the metal base plate 120 is substantially less than the coefficient of friction between the ends 106 and 108 of the metal pin and the surfaces 80 and 92 on the load cell beam 76 and slider 86. Therefore, sliding movement occurs between the bottom surface 118 and the base plate 102 before sliding movement can occur between the rocker pin 40 and either the load cell beam 76 or between the rocker pin and the slider 86. It should be noted that the coefficient of friction between the lower end of the rocker pin 40 and the slider 86 must be greater than the coefficient of friction between the slider and the base plate 102. The commonly accepted coefficient of friction between the metal rocker pin 40 and base 86 is approximately 0.7. The commonly accepted coefficient of friction between the Teflon bottom surface 118 of the slider 86 and the base plate 102 is approximately 0.06.

Upon engagement of the stop surface 66 with the bumper 64 (see FIG. 4), rightward movement of the platform 16 movement is interrupted. When the force urging the platform 16 toward the right is removed, the restoring forces in the force transmitting assembly 34 cause the force transmitting assembly to move from the maximum offset condition in FIG. 4 to the aligned condition shown in FIG. 5. When the force transmitting assembly 34 is in the aligned condition, the vertical central axis of the upper recess 78 is aligned with the vertical central axis of the lower recess 88.

As the force transmitting assembly 34 moves from the maximum offset condition of FIG. 4 to the aligned condition of FIG. 5, the rocker pin 102 is effective to cause the load cell beam 76 and platform 16 to move toward the left away from the bumper 64. Thus, when the force transmitting assembly 34 is in a maximum offset condition shown in FIG. 4, the bottom surface 80 of the recess 78 is effective to apply a downward load force component, indicated at 130 in FIG. 4, to the left side of the dome shaped upper surface 106 on the rocker pin 102. The stationary slider 86 applies an upwardly directed reaction force, indicated at 132 in FIG. 4, against the right side of the dome shaped lower surface 108 on the rocker pin 102.

The vertical force components 130 and 132 are of equal magnitude and are horizontally offset. Therefore, the force components 130 and 132 apply a counterclockwise (as seen in FIG. 4) torque to the rocker pin 102. The counterclockwise torque applied to the rocker pin 102 by the horizontally offset force components 130 and 132 is transmitted to the load cell beam 76 and is urges the load cell beam and platform 16 toward the left (as viewed in FIG. 4).

Although only force transmitting assembly 34 has been shown in FIG. 4, it should be understood that the force transmitting assemblies 38, 42 and 45 at the other corners of the platform 16 are in similar orientations and are effective to apply force to the platform urging it towards the left (as viewed in FIG. 4). This results in movement of the platform 16 and load cell beam 76 leftward from the position shown in FIG. 4 to the aligned position shown in FIG. 5. As the load cell beam 76 and platform 16 move toward the left away from the bumper 64, the slider 86 remains stationary and the rocker pin 102 pivots to an upright orientation.

When the force transmitting assembly 34 is in the aligned condition, the bottom surface 80 of the load cell beam 76 applies a vertical downwardly directed load force component, indicated at 136 in FIG. 5, against the upper surface 106 of the rocker pin 12. Similarly, the bottom surface 92 of the recess 88 in the slider 86 is effective to apply an upwardly directed vertical reaction force component 138 against the lower side surface 108 of the rocker pin 102. The force components 136 and 138 are coincident with the central axis of the rocker pin 102 and the central axes of the cylindrical recesses 78 and 88. The axially aligned vertical force components 136 and 138 did not apply any moments to the rocker pin 102. Therefore, sideward or horizontal forces are not applied to the load cell beam 76.

Each of the force transmitting assemblies at the four corners of the platform 16 may be out of alignment with the platform 16 in a different direction. Therefore, it is necessary to move the platform 16 back and forth along horizontal X and Y axes in order to be certain that all four of the force transmitting assemblies are aligned with the platform and that the platform is centered relative to the frame 22. Thus it is necessary to move the platform 16 horizontally back and forth, in the manner indicated by the arrow 144 in FIG. 6, to align the force transmitting assemblies 34, 38, 42 and 45 along the X axis and to position the sides 54 and 148 of the platform 16 relative to the sides 62 and 70 of the frame 22. In addition, it is necessary to move the platform 16 horizontally back and forth along the Y axis in the manner indicated by the arrow 158 in FIG. 6. This aligns the force transmitting assemblies 34, 38, 42 and 45 along the Y axis and centers the sides 160 and 162 of the platform 16 relative to the sides 68 and 72 of the frame 22.

Figure 6:
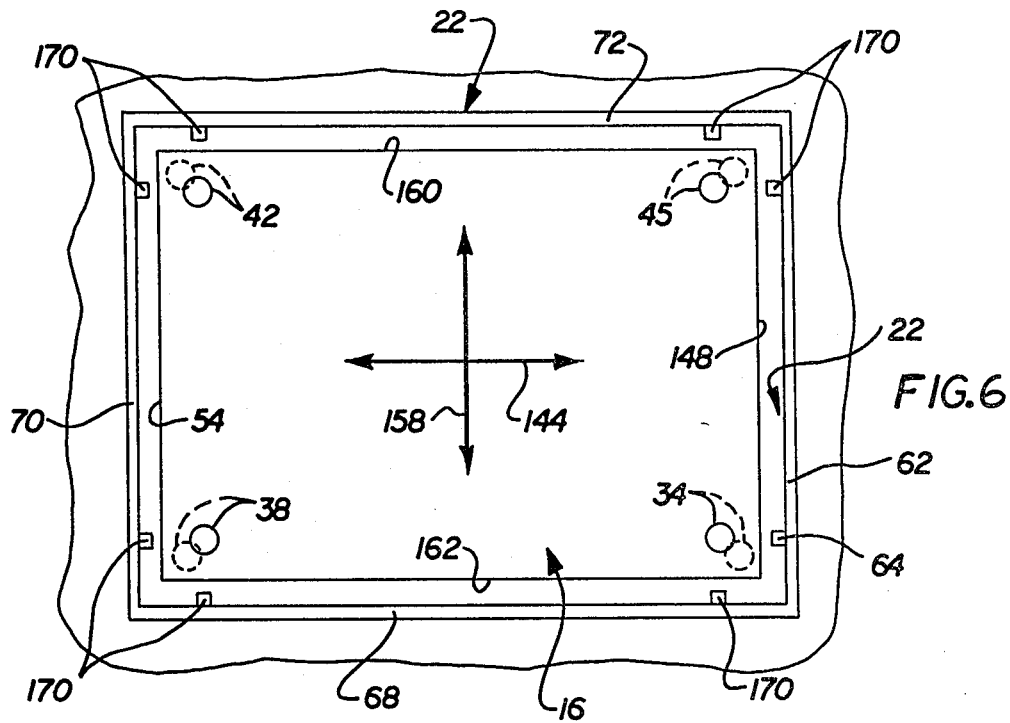
FIG. 6 is a schematic illustration depicting the relationship between the platform and force transmitting assemblies, the force transmitting assemblies being indicated in dashed lines in a nonaligned relationship with the platform and in solid lines in an aligned relationship with the platform.

As the platform 16 is moved horizontally back and forth along the X and Y axes in the manner indicated by the arrows 144 and 158 in FIG. 6, the force transmitting assemblies 34, 38, 42 and 45 move from the non-aligned conditions indicated in dashed lines in FIG. 6 to the aligned conditions indicated in solid lines in FIG. 6. Suitable bumpers 170 are provided along the frame 22 to limit the sideways movement of the platform 16 in the same manner as previously explained in connection with the bumper 64. When the force transmitting assemblies 34, 38, 42 and 45 are in the aligned condition shown in solid lines in FIG. 6, the upwardly facing recesses 88 in the sliders 86 are aligned with the downwardly facing recesses 78 in the load cells 70.

If the distance between each of the stop surfaces connected to the platform 16 and each of the bumpers connected to the frame 22 is equal to or slightly less than the distance which the components of the force transmitting assembly 34 move from the maximum offset condition of FIG. 4 to the aligned condition of FIG. 5, the centered position of the platform will not change during use of the scale assembly. This allows vehicles to be driven onto and off of the platform without permanently changing the centered condition of the platform.

If a dynamic load is applied to the platform 16 and moves the platform toward the right, as seen in FIG. 6, the load cell beam 76 will move into an abutting engagement with the bumper 64 as the force transmitting assembly 34 is actuated to the maximum offset condition (see FIG. 4). This occurs while the slider 86 remains stationary. Therefore, the restoring forces in the force transmitting assembly 34 will return the force transmitting assembly to the aligned condition shown in FIG. 5. Simultaneously therewith, the platform 16 will be returned to its previous centered position. A dynamic load could be applied to the platform 16 in many different ways, for example, a vehicle could be driven onto the platform or a conveyor extending onto the platform could be started or stopped.

It is contemplated that the distance between bumpers on opposite sides of the frame 22 may be such as to allow the platform to move slightly toward either the left or the right (as viewed in FIG. 6) between centered positions. Thus, the space in between the bumpers could be increased slightly so that each time a vehicle moves onto and off of the platform, the force transmitting assemblies 34, 38, 42 and 45 move to the maximum offset condition (shown in FIG. 4) and then continue to move through a short distance into engagement with the bumpers. This would result in realignment of the force transmitting assemblies 34, 38, 42 and 45 with the platform 16 each time a vehicle is driven onto or off of the platform. Of course, the platform would also be centered in the frame 22 each time a vehicle was driven onto or off of the platform 16.

Although the construction of only the force transmitting assembly 34 is illustrated in FIGS. 3–5, it should be understood that the force transmitting assemblies 38, 42 and 45 have the same construction and mode of operation as the force transmitting assembly 34. It should also be understood that the scale assembly 14 can be used for purposes other than weighing vehicles. Thus, other types of loads could be placed on the platform 16 and weighed by the load cells in the force transmitting assemblies. Of course, the platform could be shaped differently than shown in the drawings in order to receive a particular load.

If it becomes necessary to remove one of the load cells for maintenance, it is merely necessary to raise the platform 16, replace the load cell, and then return the platform to its position in the frame 22. The platform 16 would then be moved along the X and Y axes to align the force transmitting assemblies 34, 38, 42 and 45 and to center the platform in the frame 22 in the manner previously explained.

Figure 7:
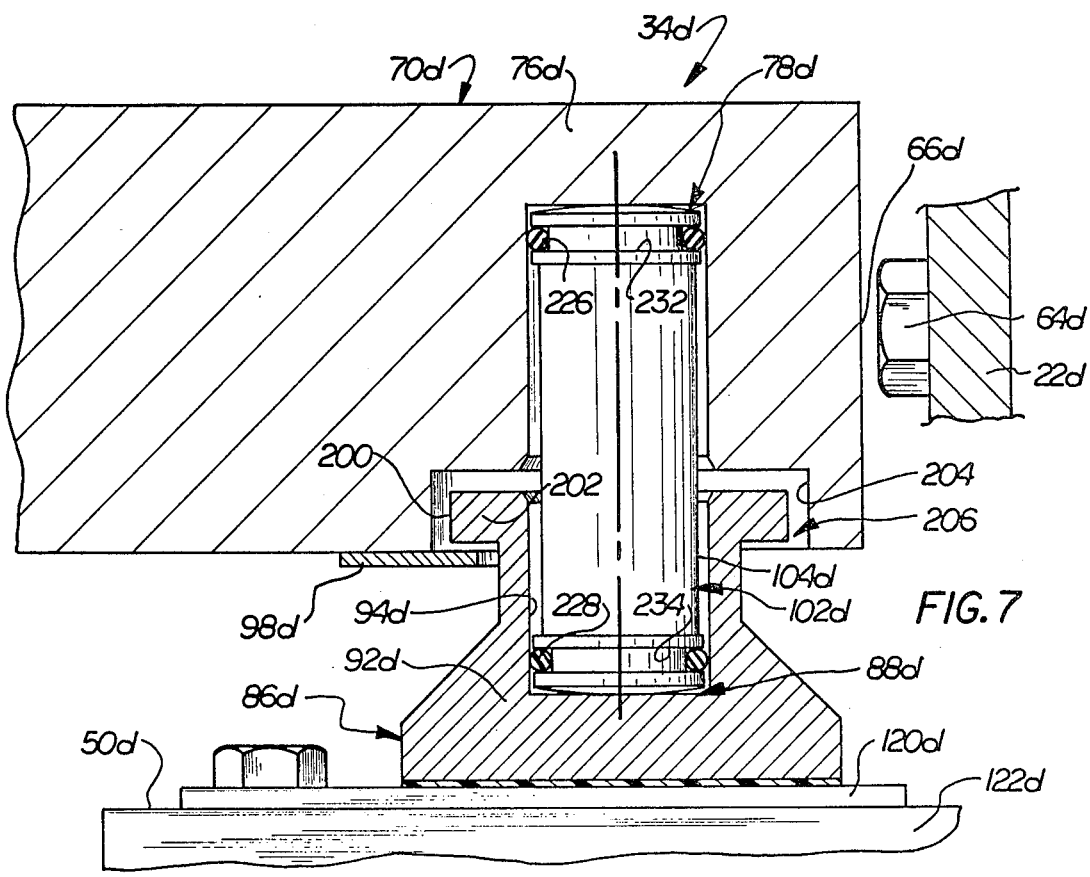
FIG. 7 is a fragmentary sectional view of a force transmitting assembly constructed in accordance with the present invention.

Force Transmitting Assembly—Embodiment of FIG. 7

The force transmitting assembly shown in FIG. 7 is constructed in accordance with the present invention. Since the force transmitting assembly shown in FIG. 7 is similar to the force transmitting assembly shown in FIGS. 3–5, similar numerals will be used to designate similar components, the suffix letter "d" being associated with the components of the invention shown in FIG. 7 in order to avoid confusion.

In the embodiment of the invention shown in FIG. 7, a force transmitting assembly 34d includes a load cell 70d having a beam or support member 76d with a cylindrical opening 78d in which the upper end portion of a rocker pin 102d is received. The lower end portion of the rocker pin 102d extends into a cylindrical opening 88d in a slider 86d. The slider 86d engages a stainless steel plate 120d fixedly connected with a base plate 122d on a base 50d. A bumper 64d is engageable with an end surface 66d of the load cell beam 76d to limit rightward (as viewed in FIG. 11) movement of the load cell beam 76d and a platform connected to the load cell beam 76d.

In accordance with a feature of the present invention, a stop surface 200 on the slider 86d is engageable with a stop surface 202 on the load cell beam 76d to limit the extent of relative movement between the load cell beam and slider. In the embodiment of the force transmitting assembly illustrated in FIGS. 3–5, the side surface 104 of the rocker pin 102 engages the circular edge portion 112 of the recess 78 to limit sidewise tilting movement of the rocker pin (see FIG. 3). This necessitates relatively accurate machining of the cylindrical recess 78 in the load cell beam 76 and accurate machining of the outer side surface 104 on the rocker pin 102. Since there is a relatively limited area of contact between the outer side surface 104 of the rocker pin 102 and the circular edge portion 112 of the recess 78, there are wear inducing stress concentrations at the circular portion 112 of the load cell beam 76 and the side surface 104 of the rocker pin. In addition, there is a tendency for the rocker pin 102 to pivot about the circular edge portion 112. Of course, any pivoting movement would result in displacement of the upper end portion 106 of the rocker pin relative to the bottom surface 80 of the recess 78.

The present invention eliminates any contact between the cylindrical side surface 104d of the rocker pin 102d and the load cell beam 76d and slider 86d. In order to limit relative movement between the slider 86d and load cell beam or support member 76d in a direction away from the aligned position shown in FIG. 7, the cylindrical stop surface 200 on a collar 202 at the upper end of the slider 86d is engageable with a cylindrical stop surface 204 formed in a cylindrical recess 206 which is coaxial with and is a continuation of the cylindrical recess 78d. Thus, when relative movement occurs between the load cell beam 76d and slider 86d to a maximum offset position, the stop surfaces 200 and 204 move into abutting engagement. This results in the slider 86d being moved relative to the base plate 122d with the load cell arm 76d upon further movement of the load cell arm relative to the base plate.

When the load cell arm 76d and slider 86d are in the aligned condition shown in FIG. 7 only vertical force components are transmitted through the rocker pin 102d. At this time, the annular stop surfaces 200 and 204 are disposed in a coaxial relationship and are separated by the same radial distance throughout their circumferential extents.

Upon movement of the platform and load cell arm 76d relative to the base 122d, the rocker pin 102d tilts in the manner previously explained in connection with the force transmitting assembly shown in FIGS. 3–5. As this is occurring, a portion of the load cell arm stop surface 204 is moving toward a portion of the slider stop surface 200. As a maximum offset condition is reached, the load cell arm stop surface 204 moves into abutting engagement with slider stop surface 200. At this time, the rocker pin 102 is tilted to the maximum extent possible. However, the cylindrical side surface 104d of the rocker pin is still spaced from the load cell arm 76d and slider 86d. Once the load cell arm stop surface 204 has engaged the slider stop surface 200, continued movement of the load cell arm 76d relative to the base 122d moves the slider 86d along the stainless steel plate 120d.

The platform and load cell arm 76d have 360 degrees of freedom of movement from the aligned position shown in FIG. 7. Since the central axes of the circular stop surfaces 200 and 204 are coincident when the force transmitting assembly 34d is in the aligned condition shown in FIG. 7, the platform and load cell arm are movable sideways through the same distance in any direction before the stop surfaces 200 and 204 are moved into abutting engagement. This results in the rocker pin 102d being tilted to the same extent regardless of which direction the rocker pin 102d is moved to a maximum offset position.

A pair of annular O-rings 226 and 228 are disposed in annular slots 232 and 234 in the upper and lower end portions of the rocker pin 102d. The O-rings 226 and 228 urge the rocker pin back to the aligned condition shown in FIG. 7. The annular slots 232 and 234 have rectangular radial cross sectional configurations. The rims of the annular slots 232 and 234 have a larger diameter than the cylindrical side wall 104d of the rocker pin 102d. This allows the rocker pin to be tilted from the aligned position shown in FIG. 7 to a maximum offset position without engaging the load cell arm 76d or slider 86d.

In the embodiment of the invention shown in FIG. 7, the load cell arm 76d is mounted for movement with the platform and the slider 86d is movable along a stationary stainless steel plate 120d disposed on a base plate 122d. However, it is contemplated that the load cell arm could be connected with the base and maintained stationary during sidewise movement of the platform. If this was done, the slider would engage a plate, similar to the plate 120d, connected to the platform for movement with the platform. It is also contemplated that the present invention could be used in association with force transmitting assemblies having force transmitting members other than a rocker pin. For example, a spherical force transmitting member could be used if desired. In addition, the stop surface 204 could be disposed on a support member which is connected with the platform and is not a load cell beam as described herein.

SUMMARY

In view of the foregoing description, it is apparent that the scale assembly 14 includes a platform 16 which is supported by a plurality of force transmitting assemblies 34, 38, 42 and 45. The force transmitting assemblies 34, 38, 42 and 45 and platform 16 cooperate to automatically center the platform relative to an enclosing structure 22. The concept of constructing the force transmitting assemblies 34, 38, 42 and 45 to automatically center a platform relative to an enclosing structure was invented by Mr. Benny N. Dillon, to whom this application is assigned, and claimed in application Ser. No. 527,325, filed Aug. 29, 1983 and entitled SELF-ALIGNING SCALE ASSEMBLY AND METHOD.

In accordance with the present invention, stop surfaces 200 and 204 for limiting the extent of movement between the load cell arm 76d and slider 86d are disposed on the slider and load cell arm. Thus, when the load cell arm 76d and slider 86d have moved to a maximum offset condition, the circular stop surface 204 on the load cell arm or support member 76d and the circular stop surface 200 on the slider 86d are disposed in abutting engagement to prevent further relative movement between the slider and load cell arm. In addition, forces for effecting sliding movement of the slider 86d relative to the base 122d are transmitted through the area of abutting engagement between the stop surfaces 200 and 204 once the force transmitting assembly 34d has been actuated to a maximum offset position.

Having described specific preferred embodiments of the invention, the following is claimed:

1. An assembly comprising a load receiving means for receiving a load to be weighed, a plurality of force-transmitting assemblies for transmitting the load to a base, each of said force transmitting assemblies including a force measuring transducer, a slider member slidable relative to said load receiving means or base, and a self-restoring force-transmitting member for vertically transmitting a force component between said slider and force measuring transducer when said slider and force measuring transducer are aligned, means for effecting relative sliding movement between said slider and load receiving means or base to align said force measuring transducer and slider member in response to sideways movement of said load receiving means, a first stop surface connected with said load receiving means, and a second stop surface connected with said slider, said first and second stop surfaces being engageable to limit relative movement between said slider and load receiving means or base.

2. An assembly as set forth in claim 1 wherein said first stop surface is disposed in a recess connected with said force measuring transducer, said slider and force-transmitting member extending into said recess with said force transmitting member spaced from said first stop surface.

3. An assembly as set forth in claim 2 wherein said second stop surface is disposed on an outer side of said slider, said second stop surface being spaced from said first stop surface when said slider and force measuring transducer are aligned.

4. An assembly as set forth in claim 1 wherein said first and second stop surfaces have circular configurations, said first and second stop surfaces being disposed in a coaxial relationship when said slider and force measuring transducer are aligned.

5. An assembly as set forth in claim 4 wherein the central axes of said first and second stop surfaces are offset when said force measuring transducer and slider are nonaligned.

6. An assembly comprising load receiving means for receiving a load, said load receiving means being movable relative to a base, and force transmitting means for transmitting force from said load receiving means to the base, said force transmitting means including a support member, a slider member disposed in abutting engagement with a surface, a movable force transmitting member disposed in engagement with said support and slider members, said support and slider members being relatively movable from an aligned position through a series of increasingly offset positions to a maximum offset position without effecting relative movement between said slider member and said surface during movement of said load receiving means relative to the base, said support and slider members being effective to apply vertically aligned force components to said force transmitting member when said support and slider members are in the aligned position, said support and slider members being effective to apply to said force transmitting member vertical force components which are offset by a horizontal distance which increases as the extent to which said support and slider members are offset increases during movement of said load receiving means relative to the base, a first stop surface area connected with said slider member, and a second stop surface area connected with said support member, said first and second stop surface areas being disposed in abutting engagement when said support and slider members are in their maximum offset positions to prevent relative movement between said slider and support members in a direction away from the aligned position during continued movement of said load receiving means and relative to the base.

7. An assembly as set forth in claim 6 wherein said force transmitting member includes a first portion disposed in abutting engagement with said support member and a second portion which is disposed in abutting engagement with said slider member when said support and slider members are in their maximum offset positions, said force transmitting member having an intermediate portion which extends between said first and second portions and is spaced apart from said slider and support members when said slider and support members are in their maximum offset positions.

8. An assembly as set forth in claim 6 wherein said support and slider members have 360 degrees of freedom of relative movement from the aligned position to any one of a plurality of offset positions, said first and second stop surface areas have a circular configuration with one of said stop surface areas circumscribing the other stop surface area to enable said first and second stop surface areas to move into abutting engagement upon movement of said support and slider members to any one of their maximum offset positions.

9. An assembly as set forth in claim 6 wherein said support and slider members include surface means for defining an upwardly opening recess and a downwardly opening recess, said force transmitting member having a first portion disposed in said first recess and a second portion disposed in said second recess, said second stop surface area being a portion of the side of the recess in said support member, said slider member extending into said recess in said support member to enable said first stop surface area to engage said second stop surface area.

10. An assembly as set forth in claim 9 wherein said recesses in said support and slider members have vertical central axes which are coincident with said support and slider members are in the aligned position and which are horizontally offset when said support and slider members are in one of their offset positions.

11. An assembly as set forth in claim 6 wherein said first and second stop surface areas have central axes which are coincident when said support and slider members are in the aligned position, said central axes of said first and second stop surfaces being offset when said support and slider members are in any one of their offset positions.

12. An assembly as set forth in claim 6 wherein said force transmitting member is a pin having first and second arcuate end portions interconnected by a body portion, said first arcuate end portion of said pin being disposed in abutting engagement with said slider member, said second arcuate end portion of said pin being disposed in abutting engagement with said support member.

* * * * *